United States Patent [19]

Freedman et al.

[11] 4,009,324
[45] Feb. 22, 1977

[54] PHOTODEGRADABLE POLYOLEFIN COMPOSITION CONTAINING AN N-HALO LACTAM

[75] Inventors: Bernard Freedman, Berkeley; Martin J. Diamond, Oakland, both of Calif.

[73] Assignee: The United States of America as represented by the Secretary of Agriculture, Washington, D.C.

[22] Filed: Apr. 2, 1976

[21] Appl. No.: 673,012

Related U.S. Application Data

[62] Division of Ser. No. 582,507, May 30, 1975, Pat. No. 3,968,095, which is a division of Ser. No. 453,911, March 22, 1974, Pat. No. 3,932,352.

[52] U.S. Cl. .............................. 526/6; 204/159.14; 204/159.23; 260/DIG. 43
[51] Int. Cl.$^2$ ......................................... C08J 3/20
[58] Field of Search .......... 526/50, 6; 260/DIG. 43; 204/159.14, 159.23

[56] References Cited

UNITED STATES PATENTS 3,865,767  2/1975  Boberg ...................... 260/DIG. 43

OTHER PUBLICATIONS

"Journal of Applied Polymer Science", vol. 20, 463–472 (1976) Freedman et al.
"Chemical Reviews", vol. 48, (1946) Djerossi, pp. 291–314.
"Chemical Reviews", vol. 63, pp. 21–43 (1963) Filler.

*Primary Examiner*—Eugene C. Rzucidlo
*Attorney, Agent, or Firm*—M. Howard Silverstein; David G. McConnell

[57] ABSTRACT

Polyolefins capable of photodegradation are prepared by incorporating in the polyolefin an additive which contains chlorine, bromine, or iodine directly linked to the nitrogen atom of an amide or imide group.

2 Claims, No Drawings

PHOTODEGRADABLE POLYOLEFIN COMPOSITION CONTAINING AN N-HALO LACTAM

This is a division of our copending application Ser. No. 582,507, filed May 30, 1975, now U.S. Pat. No. 3,968,095, which in turn is a division of our prior application, Ser. No. 453,911, filed Mar. 22, 1974, now U.S. Pat. No. 3,932,352.

DESCRIPTION OF THE INVENTION

The invention relates to and has among its objects the provision of novel plastic compositions capable of photodegradation. Further objects of the invention will be evident from the following description wherein parts and percentages are by weight unless otherwise specified.

Plastics have become an important part of the American way of life. Innumerable articles of manufacture are made of plastics. One of the main uses thereof is in the manufacture of containers for liquids and solids of all kinds, particularly foods. Another important use is the manufacture of plastic sheet materials such as films and foils. For example, plastic films are used in agriculture for covering the soil between plants, thereby to prevent the growth of weeds.

One problem with plastics is that they are not easily decomposed. Thus, for example, plastic food containers thrown by the roadside do not decompose but remain until collected, thereby polluting the environment. Similarly, plastic films used as soil coverings must be removed from the fields prior to initiating a new crop.

The invention described herein concerns a means for obviating the above problems in that it provides polyolefin plastics which are capable of photodegradation. Containers fabricated from the plastics of the invention when exposed to sunlight will gradually decompose and eventually crumble away. Thus, such containers when thrown along the roadside will eventually become part of the soil. Films prepared from the plastics of the invention when used for agricultural purposes will gradually become friable by the action of sunlight so that they can be readily plowed into the soil.

The benefits of the invention are realized by incorporating into a polyolefin any of the compounds described below.

Group I

N-halo imides of the structure

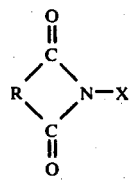

wherein:
X is chlorine, bromine, or iodine
R is a divalent hydrocarbon radical containing 1 to 12 carbon atoms.

Illustrative examples of compounds included in Group I are:
N-chloro-succinimide
N-bromo-succinimide
N-iodo-succinimide
N-chloro-phthalimide
N-bromo-phthalimide
N-iodo-phthalimide The N-chloro, N-bromo-, or N-iodo derivatives of the imides of malonic, glutaric, adipic, pimelic, suberic, azelaic, or sebacic acids.

Group II

N-Halo amides of the structure

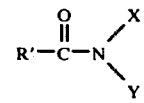

wherein:
X is chlorine, bromine, or iodine
Y is hydrogen, chlorine, bromine, or iodine
R' is a monovalent hydrocarbon radical containing 1 to 18 carbon atoms.

Illustrative examples of compounds included in Group II are:
N-chloro-acetamide
N-bromo-acetamide
N-iodo-acetamide
N,N-dichloro-acetamide
N,N-dibromo-acetamide
N,N-diiodo-acetamide
N-chloro-benzamide
N-bromo-benzamide
N-iodo-benzamide
N,N-dichloro-benzamide
N,N-dibromo-benzamide
N,N-diiodo-benzamide The N-chloro-, N-bromo-, N-iodo-, N,N-dichloro-, N,N-dibromo-, and N,N-diiodo- derivatives of the amides of propionic, butyric, valeric, caproic, capric, caprylic, lauric, stearic, toluic, or cyclohexane carboxylic acids.

Group III

N-Halo lactams of the structure

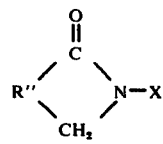

wherein:
X is chlorine, bromine, or iodine
R'' is a divalent aliphatic hydrocarbon radical containing 1 to 12 carbon atoms.

Illustrative examples of compounds included in Group III are:
N-chloro-caprolactam
N-bromo-caprolactam
N-iodo-caprolactam
N-chloro-, N-bromo-, or N-iodo-butyrolactam
N-chloro-, N-bromo-, or N-iodo-valerolactam.

Group IV

N-Halo hydantoins of the structure

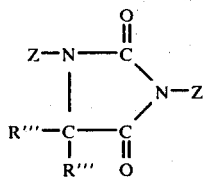

wherein:
One of the Z's is chlorine, bromine, or iodine, and the other Z is hydrogen, chlorine, bromine, or iodine.

R''' is hydrogen or a lower ($C_1$-$C_4$) alkyl radical.

Illustrative examples of compounds included in Group IV are:
1-chloro-hydantoin
1-bromo-hydantoin
1-iodo-hydantoin
3-chloro-hydantoin
3-bromo-hydantoin
3-iodo-hydantoin
1,3-dichloro-hydantoin
1,3-dibromo-hydantoin
1,3-diiodo-hydantoin
3-chloro-5-methylhydantoin
3-bromo-5-methylhydantoin
3-iodo-5-methylhydantoin
1,3-dichloro-5-methylhydantoin
1,3-dibromo-5-methylhydantoin
1,3-diiodo-5-methylhydantoin
1-chloro-5,5-dimethylhydantoin
1-bromo-5,5-dimethylhydantoin
1-iodo-5,5-dimethylhydantoin
3-chloro-5,5-dimethylhydantoin
3-bromo-5,5-dimethylhydantoin
3-iodo-5,5-dimethylhydantoin
1,3-dichloro-5,5-dimethylhydantoin
1,3-dibromo-5,5-dimethylhydantoin
1,3-diiodo-5,5-dimethylhydantoin

Group V

N-Halo urethanes of the structure

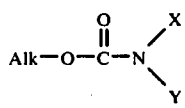

wherein:
X is chlorine, bromine, or iodine
Y is hydrogen, chlorine, bromine, or iodine
Alk is a monovalent aliphatic hydrocarbon radical containing 1 to 18 carbon atoms.

Illustrative examples of compounds included in Group V are:
N-chloro-urethane
N-bromo-urethane
N-iodo-urethane
N,N-dichloro-urethane
N,N-dibromo-urethane
N,N-diiodo-urethane The isopropyl, buty, hexyl, decyl, dodecyl, and octadecyl esters of N-chloro-, N-bromo-, N-iodo-, N,N-dichloro-, N,N-dibromo-, and N,N-diiodo-carbamic acid.

Group VI

N-Halo sulphonamides of the structure

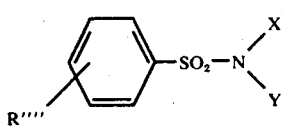

wherein:
X is chlorine, bromine, or iodine
Y is hydrogen, chlorine, bromine, or iodine
R'''' is hydrogen, lower ($C_1$-$C_4$) alkyl, chlorine, bromine, or iodine.

Illustrative examples of compounds included in Group VI are the N-chloro-, N-bromo-, N-iodo-, N,N-dichloro-, N,N-dibromo-, and N,N-diiodo- derivatives of benzenesulphonamide, toluenesulphonamide, and isopropylbenzenesulphonamide.

Group VII

N-Halo isocyanuric acids of the structure

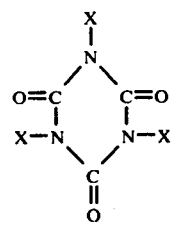

wherein:
X is chlorine, bromine, or iodine.

Illustrative examples of compounds included in Group VII are trichloro-, tribromo-, and triiodo-isocyanuric acid.

Polyolefins containing any of the above compounds (or additives as they are often referred to herein) decompose readily when exposed to sunlight. The decomposition, however, is not instantaneous but is gradual, and the rate thereof depends on such factors as the type of polyolefin, the amount of the compound added, and the activity of the latter. The reaction which takes place can be described as a photodepolymerization in which the polymeric chains are reduced to lower molecular weight under the influence of sunlight.

The amount of additive to be incorporated with the polyolefin depends on the activity of the additive, and upon the desired rate of photo-decomposition. In general, one may use about 0.1 to 10% of the additive, based upon the weight of polyolefin. For most purposes about 1 to 2% of the additive is sufficient to obtain a reasonable and useful rate of photo-degradation.

The polyolefin to which the invention is applied includes, for example, high and low density polyethylene, polypropylene, polybutylene, polystyrene, mixtures of polyethylene and polypropylene, vinyl acetate/ethylene copolymers, and the like. The incorporation of the additive with the polyolefin may be carried out in any of the ways known in the art of compounding plastics. For example, intimate mixing of the polyolefin and additive may be effected by melting and mixing the polyolefin with the additive by any suitable means such as a mixer of the Banbury or Werner type or in a screw extruder. The compositions of polyolefin and additive can be formed into any desired articles such as films, tubular sheets, foils, bags, bottles, or other containers by application of well-known molding and fabricating techniques.

It is within the compass of the invention to use known photosensitizing compounds such as dibenzoyl peroxide, azo-bis-isobutyronitrile, and the like in conjunction with the additives of the invention. In some instances such photo-sensitizers increase the activity of the additives of the invention. Thus, polyolefins containing an additive in accordance with the invention and a photosensitizer will exhibit an enhanced rate of photodegradation.

EXAMPLES

The invention is further demonstrated by the following illustrative examples.

EXAMPLE 1

Photodegradable Polystyrene Films

A. Commercial polystyrene powder was first purified as follows: The powder (90 g.) was placed in a 2-liter Erlenmeyer flask together with 510 ml. of chloroform and the mixture was shaken until dissolved. The solution was poured slowly with vigorous stirring into a one-gallon Waring Blendor containing 2 liters of methanol. The finely precipitated powder was filtered, washed with methanol, air-dried, and finally dried in a vacuum oven at 52° C. and 30 p.s.i. This procedure was repeated for a total of three times and a polystyrene containing no styrene odor was obtained.

B. Incorporation of additive: A wide-mouth jar was charged with 3 g. of the purified polystyrene powder, 0.03 g. of additive, and 17 ml. of chloroform, then shaken on a wrist-action shaker until solution was obtained. The solution was allowed to stand for a few minutes to remove entrapped air bubbles. Afterward, the solution was spread on a 4 × 8 inch glass plate with a filmcasting knife with a setting of 0.038 in. The plate was suspended above chloroform in a covered tray to retard evaporation of the solvent. After the plate had dried overnight, it was placed in a tray containing distilled water, which floated the film away from the glass. This film of polystyrene plus the incorporated additive was about 0.004–0.005 inch thick. A piece, ¾ inch × 1-⅜inches was cut from the film and its infrared spectrum was taken.

C. Test procedure: The said piece of film was then irradiated for 66 hours by maintaining it on a revolving table 9 in. in diameter with the film sample 6 in. from a 275-watt RS sunlamp. After irradiation, an infrared spectrum of the sample was again determined. The extent of photo-oxidation was taken as a measure of the photodegradability of the irradiated material. Photooxidation was determined by measuring the increase in the carbonyl absorption band of the irradiated sample over that of an irradiated sample containing no additive.

D. Specific additives used: The sequence described above in parts A, B, and C was performed with the following additives, each in the amount of 1%, based on the weight of polystyrene:

A. N-bromosuccinimide 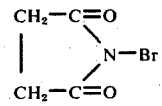

B. N-chlorosuccinimide 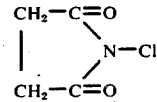

C. N-bromocaprolactam 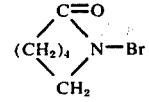

D. 1,3-dibromo-5,5-dimethylhydantoin 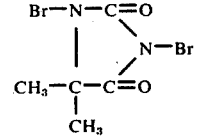

E. 3-bromo-5,5-dimethylhydantoin 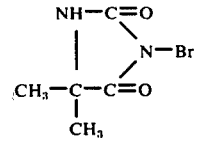

F. N-bromoacetamide 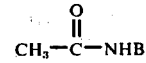

G. N,N-dichlorourethane 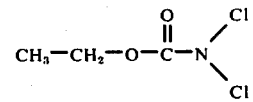

H. N,N-dichlorobenzene-sulphonamide 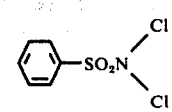

I. Trichloroisocyanuric acid 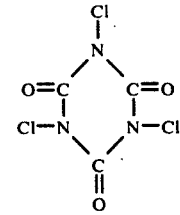

The results obtained are tabulated below:

Table 1

| | | Polystyrene and 1% Additive | |
|---|---|---|---|
| Run | Additive | Increase in carbonyl, absorbance units | Additive effectiveness ratio* |
| A | N-bromosuccinimide | 1.065 | 6.1 |
| B | N-chlorosuccinimide | 0.563 | 3.1 |
| C | N-bromocaprolactam | 0.724 | 4.1 |
| D | 1,3-dibromo-5,5-dimethylhydantoin | 1.453 | 8.3 |
| E | 3-bromo-5,5-dimethylhydantoin | 1.189 | 6.8 |
| F | N-bromoacetamide | 0.506 | 2.9 |

Table 1-continued

| | Polystyrene and 1% Additive | | |
|---|---|---|---|
| Run | Additive | Increase in carbonyl, absorbance units | Additive effectiveness ratio* |
| G | N,N-dichlorourethane | 0.325 | 1.9 |
| H | N,N-dichlorobenzenesulphonamide | 0.383 | 2.2 |
| I | Trichloroisocyanuric acid | 0.413 | 2.4 |
| Control | None used | 0.176 | 1.0 |

*Additive effectiveness ratio is equal to the increase in carbonyl for a particular additive divided by the increase in carbonyl obtained without additive (control). Thus, for example, polystyrene containing N-bromosuccinimide is oxidized photochemically 1.065/.176 or 6.1 times more than polystyrene without an additive.

EXAMPLE 2

Photodegradable Polyethylene Films

To 0.6 gram of powdered polyethylene resin was added a solution of 0.006 gram of N-bromosuccinimide in 0.6 ml. of acetone. The mixture was stirred to evenly distribute the additive solution over the particles of polyethylene. The mixture was spread as a thin layer on a Mylar sheet supported by a ferrotype chrome plate. After allowing the acetone to evaporate, the said layer was covered with another Mylar sheet and chrome plate. This assembly was heated for 30 seconds at 350° F. and then pressed at 370 psi. for 30 seconds. The assembly was then transferred to an unheated press and pressed at 4,000 psi. while cooling. A film of polyethylene and 1% added N-bromosuccinimide having a thickness of 0.003 to 0.004 inch was thus obtained.

A similar procedure was employed for the preparation of polyethylene films containing other additives. The temperature of the heated press was varied from 350°–412° F., depending on the melting point of the additive. In general, the temperature of the press was about 10° F. above the melting point of the additive.

Samples of the polyethylene-additive film and control polyethylene film without any additive were tested for photodegradability as described in Example 1, except that the time of irradiation was 100 hours.

The results obtaied are summarized below.

Table 2

| | Polyethylene + Additive | | |
|---|---|---|---|
| Run | Additive | Increase in carbonyl, absorbance units | Additive effectiveness ratio |
| 1 | N-bromosuccinimide (1%) | 0.299 | 1.2 |
| 2 | 1,3-dibromo-5,5-dimethylhydantoin (1%) | 0.332 | 1.4 |
| 3 | benzoyl peroxide* (1%) | 0.138 | 0.6 |
| 4 | 1,3-dibromo-5,5-dimethylhydantoin (1%) and benzoyl peroxide (1%) | 0.415 | 1.7 |
| Control | None used | 0.241 | 1.0 |

*Not illustrative of the invention; included for the purpose of comparison.

EXAMPLE 3

Photodegradable Polypropylene Films

Polypropylene films containing additives were prepared by the same procedure described in Example 2. Photodegradability of the resulting film was determined as described in Example 1, but using an irradiation time of 66 hours.

The results are tabulated below.

Table 3

| | Polypropylene + Additives | | |
|---|---|---|---|
| Run | Additive | Increase in carbonyl, absorbance units | Additive effectiveness ratio |
| 1 | N-bromosuccinimide (1%) | 0.912 | 2.0 |
| 2 | N-iodosuccinimide (1%) | 0.547 | 1.3 |
| 3 | N-bromoacetamide (1%) | 0.629 | 1.4 |
| 4 | N,N-dichlorourethane (1%) | 0.705 | 1.5 |
| 5 | 3-bromo-5,5-dimethylhydantoin (1%) | 0.587 | 1.3 |
| 6 | benzoyl peroxide* (1%) | 0.786 | 1.7 |
| 7 | N-bromosuccinimide (1%) and benzoyl peroxide (1%) | 2.571 | 5.6 |
| Control | None used | 0.462 | 1.0 |

*Not illustrative of the invention; included for purposes of comparison.

EXAMPLE 4

To 0.6 gram of powdered polypropylene was added a solution of 0.006 gram of trichloroisocyanuric acid in 0.6 ml. of acetone. The mixture was stirred to evenly distribute the additive solution over the particles of polypropylene. The mixture was spread as a thin layer on a Teflon sheet supported by a ferrotype chrome plate. After allowing the acetone to evaporate, the said layer was covered with another Teflon sheet and chrome plate. This assembly was heated for 30 seconds at 480° F. and then pressed at 65 psi for 30 seconds. The assembly was then transferred to an unheated press and pressed at 4,000 psi while cooling. A film of polypropylene and 1% added trichloroisocyanuric acid having a thickness of about 0.004 inch was thus obtained.

Samples of this film and a control polypropylene film without an additive were tested for photodegradability as described in Example 1.

The results are given below.

| Additive | Increase in carbonyl, absorbance units | Additive effectiveness ratio |
| --- | --- | --- |
| Trichloroisocyanuric acid (1%) | 1.032 | 4.9 |
| None (control) | 0.212 | 1 |

EXAMPLE 5

A film was prepared from purified polystyrene plus 1% N-bromophthalimide as described in Example 1. The film and a control film without the additive were tested as described in Example 1. It was found that the film containing the additive was photodegraded 3.1 times more than the control film.

Having thus described our invention, we claim:

1. A photodegradable composition comprising a polyolefin and about from 0.1 to 10%, based on the weight of polyolefin, of an additive of the structure

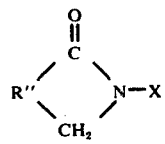

wherein X is chlorine, bromine, or iodine, and R'' is a divalent aliphatic hydrocarbon radical containing 1 to 12 carbon atoms.

2. The composition of claim 1 wherein the additive is N-bromocaprolactam.

* * * * *